United States Patent
Erceg et al.

(10) Patent No.: US 9,693,385 B2
(45) Date of Patent: Jun. 27, 2017

(54) SHARED PLCP PROTOCOL DATA UNIT (PPDU) WITHIN WIRELESS COMMUNICATIONS

(71) Applicant: BROADCOM CORPORATION, Irvine, CA (US)

(72) Inventors: Vinko Erceg, Cardiff by the Sea, CA (US); Ron Porat, San Diego, CA (US); Nihar Jindal, San Francisco, CA (US); Matthew James Fischer, Mountain View, CA (US); Yong Liu, Campbell, CA (US); Chiu Ngok Eric Wong, San Jose, CA (US)

(73) Assignee: Avago Technologies General IP (Singapore) Pte. Ltd, Singapore (SG)

( * ) Notice: Subject to any disclaimer, the term of this patent is extended or adjusted under 35 U.S.C. 154(b) by 157 days.

(21) Appl. No.: 14/221,438

(22) Filed: Mar. 21, 2014

(65) Prior Publication Data
US 2014/0286238 A1    Sep. 25, 2014

Related U.S. Application Data

(60) Provisional application No. 61/804,717, filed on Mar. 24, 2013, provisional application No. 61/949,354, filed on Mar. 7, 2014.

(51) Int. Cl.
*H04W 80/00*    (2009.01)

(52) U.S. Cl.
CPC .................................. *H04W 80/00* (2013.01)

(58) Field of Classification Search
None
See application file for complete search history.

(56) References Cited

U.S. PATENT DOCUMENTS

| | | | |
|---|---|---|---|
| 8,135,015 B2* | 3/2012 | Rajkotia | H04L 1/1812 370/392 |
| 2002/0167894 A1* | 11/2002 | Jacobsen | H04L 27/2628 370/208 |
| 2006/0018268 A1* | 1/2006 | Kakani | H04W 28/06 370/278 |
| 2006/0133402 A1* | 6/2006 | Dottling | H04L 1/0001 370/431 |

(Continued)

*Primary Examiner* — Huy D Vu
*Assistant Examiner* — James P Duffy
(74) *Attorney, Agent, or Firm* — Garlick & Markison; Shayne X. Short

(57) ABSTRACT

A wireless communication device is configured to generate frames based on any of a number of different frame formats for transmission to one or more other recipient wireless communication devices. The frame may be implemented to include data intended for two or more recipient devices. The device encodes first data intended for a first recipient device using first one or more coding parameters and encodes second data intended for a second recipient device using second one or more coding parameters. The manner by which the first and second data have been encoded is indicated within one or more other fields within the frames based on the selected frame format. In one example, a single preamble specifies the first and second one or more coding parameters. In another example, an initial preamble and one or more respective sub-preambles specify the first and second one or more coding parameters.

20 Claims, 9 Drawing Sheets

(56) References Cited

U.S. PATENT DOCUMENTS

2009/0185632 A1* 7/2009 Cai ................. H04L 5/0044
  375/260
2009/0232124 A1* 9/2009 Cordeiro ............ H01Q 3/26
  370/349

* cited by examiner

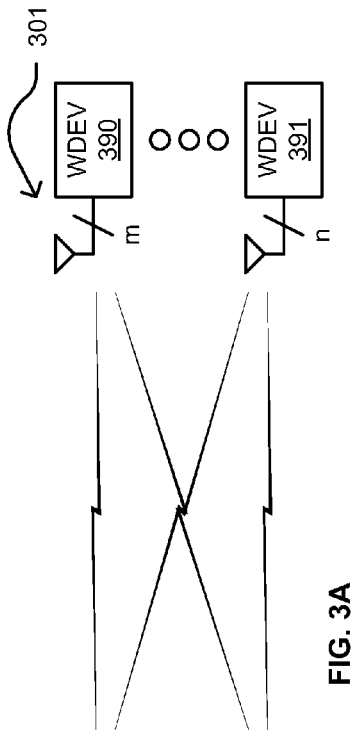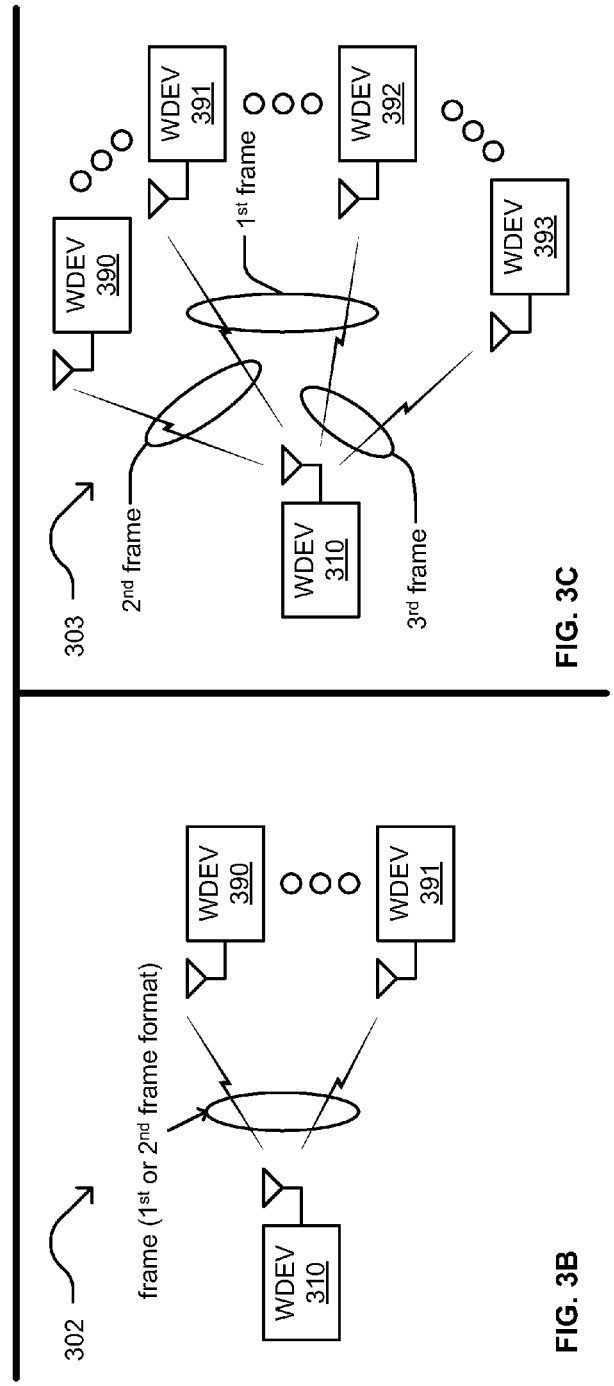
FIG. 3A
FIG. 3B
FIG. 3C

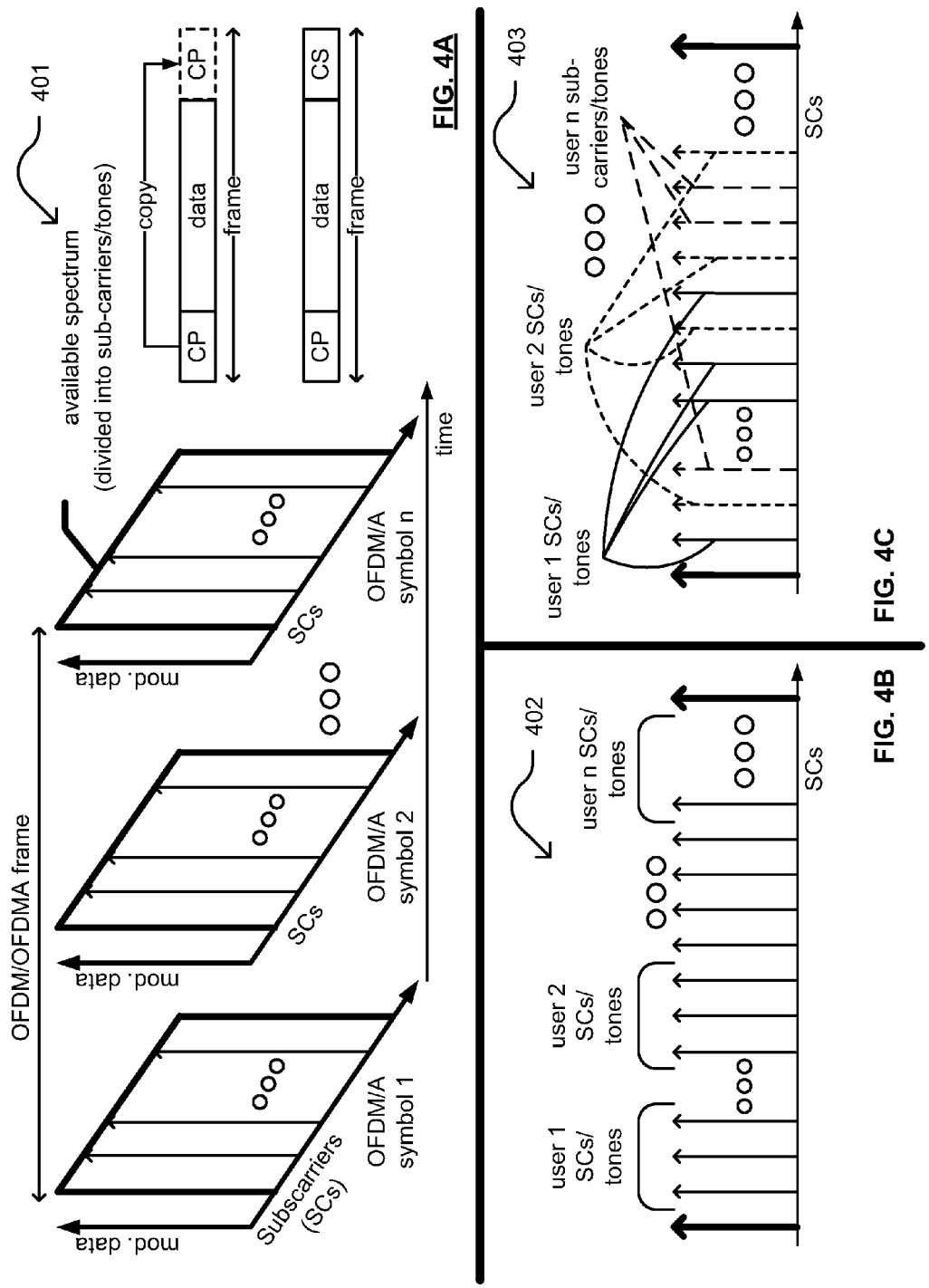

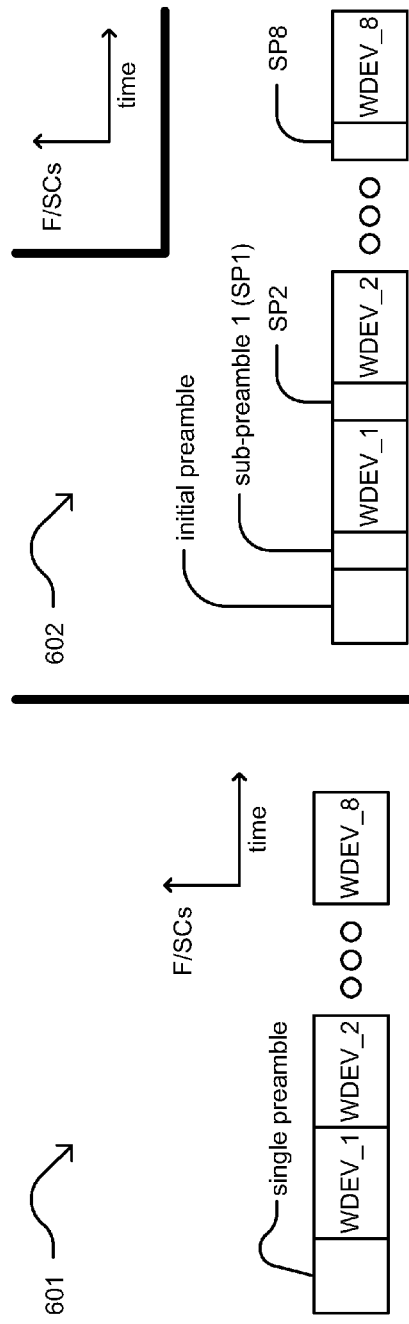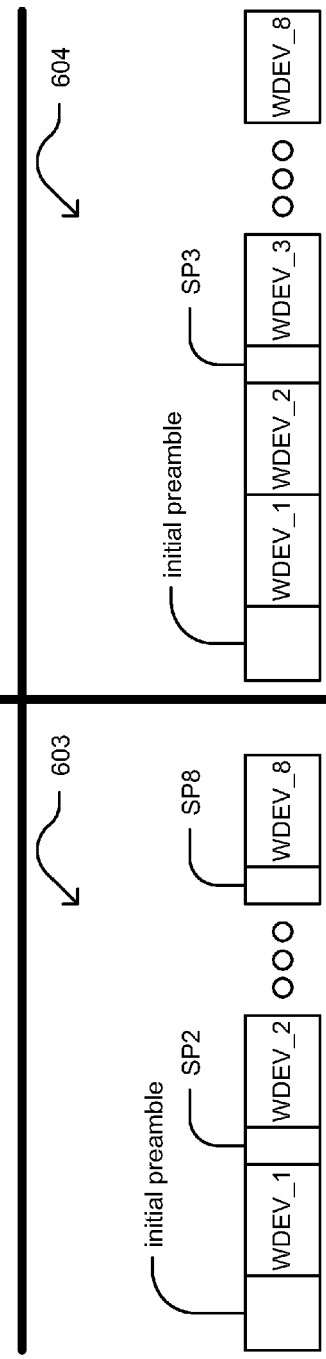

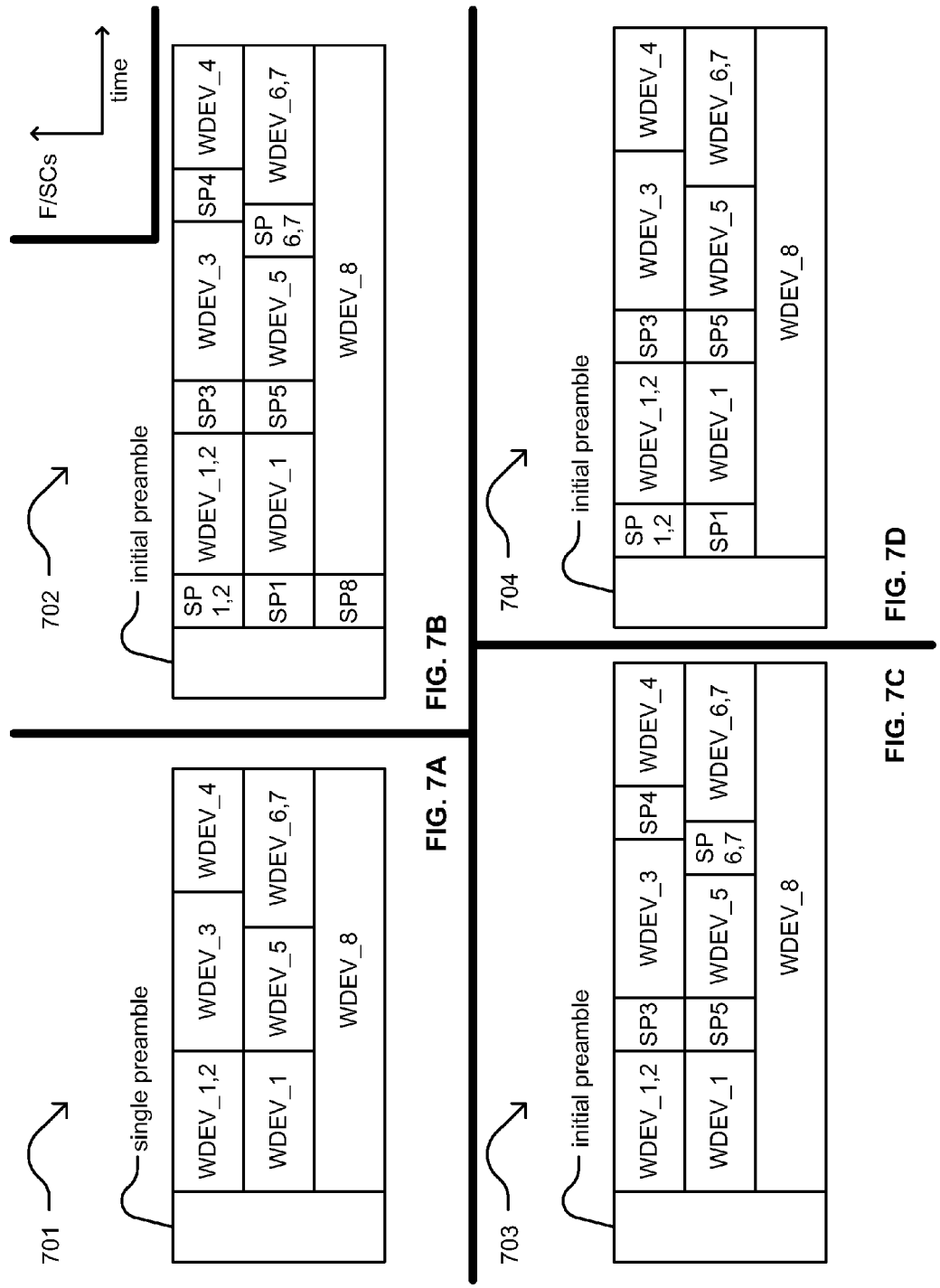

SHARED PLCP PROTOCOL DATA UNIT (PPDU) WITHIN WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to U.S. Provisional Application No. 61/804,717, entitled "Shared PLCP Protocol Data Unit (PPDU) within single user, multiple user, multiple access, and/or MIMO wireless communication", filed Mar. 24, 2013; and U.S. Provisional Application No. 61/949,354, entitled "Shared PLCP Protocol Data Unit (PPDU) within wireless communications", filed Mar. 7, 2014, both of which are hereby incorporated herein by reference in their entirety and made part of the present U.S. Utility Patent Application for all purposes.

BACKGROUND

Technical Field

The present disclosure relates generally to communication systems; and, more particularly, to communications between communication devices within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into RF signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Significant progress has been made over the years in communication systems including wireless communication systems. However, conventional technologies fail to meet the seemingly ever-increasing expectations of increased ever-increasing number of concurrently operational devices and ever-increasing increased amounts of information to be transmitted between devices. When communications of different formats are made between multiple different devices, a significant amount of control-based signaling is also required between those devices so that transmitted information may be properly received and processed. Increasing the amount of control-based signaling among devices to ensure they may operate correctly and appropriately process information transmitted between them competes with the already limited available resources within the communication system. The present state of the art includes much room for improvement in terms of increasing the overall data throughput among many different devices within a communication system.

BRIEF DESCRIPTION OF THE SEVERAL VIEWS OF THE DRAWINGS

FIG. 3A is a diagram illustrating an example of communication between wireless communication devices.

FIG. 3B is a diagram illustrating another example of communication between wireless communication devices.

FIG. 3C is a diagram illustrating another example of communication between wireless communication devices.

FIG. 4A is a diagram illustrating an example of orthogonal frequency division multiplexing (OFDM) and/or orthogonal frequency division multiple access (OFDMA).

FIG. 4B is a diagram illustrating another example of OFDMA.

FIG. 4C is a diagram illustrating another example of OFDMA.

FIG. 6A is a diagram illustrating another example of an OFDMA frame.

FIG. 6B is a diagram illustrating another example of an OFDMA frame.

FIG. 6C is a diagram illustrating another example of an OFDMA frame.

FIG. 6D is a diagram illustrating another example of an OFDMA frame.

FIG. 7A is a diagram illustrating another example of an OFDMA frame.

FIG. 7B is a diagram illustrating another example of an OFDMA frame.

FIG. 7C is a diagram illustrating another example of an OFDMA frame.

FIG. 7D is a diagram illustrating another example of an OFDMA frame.

DETAILED DESCRIPTION

Figure 1:
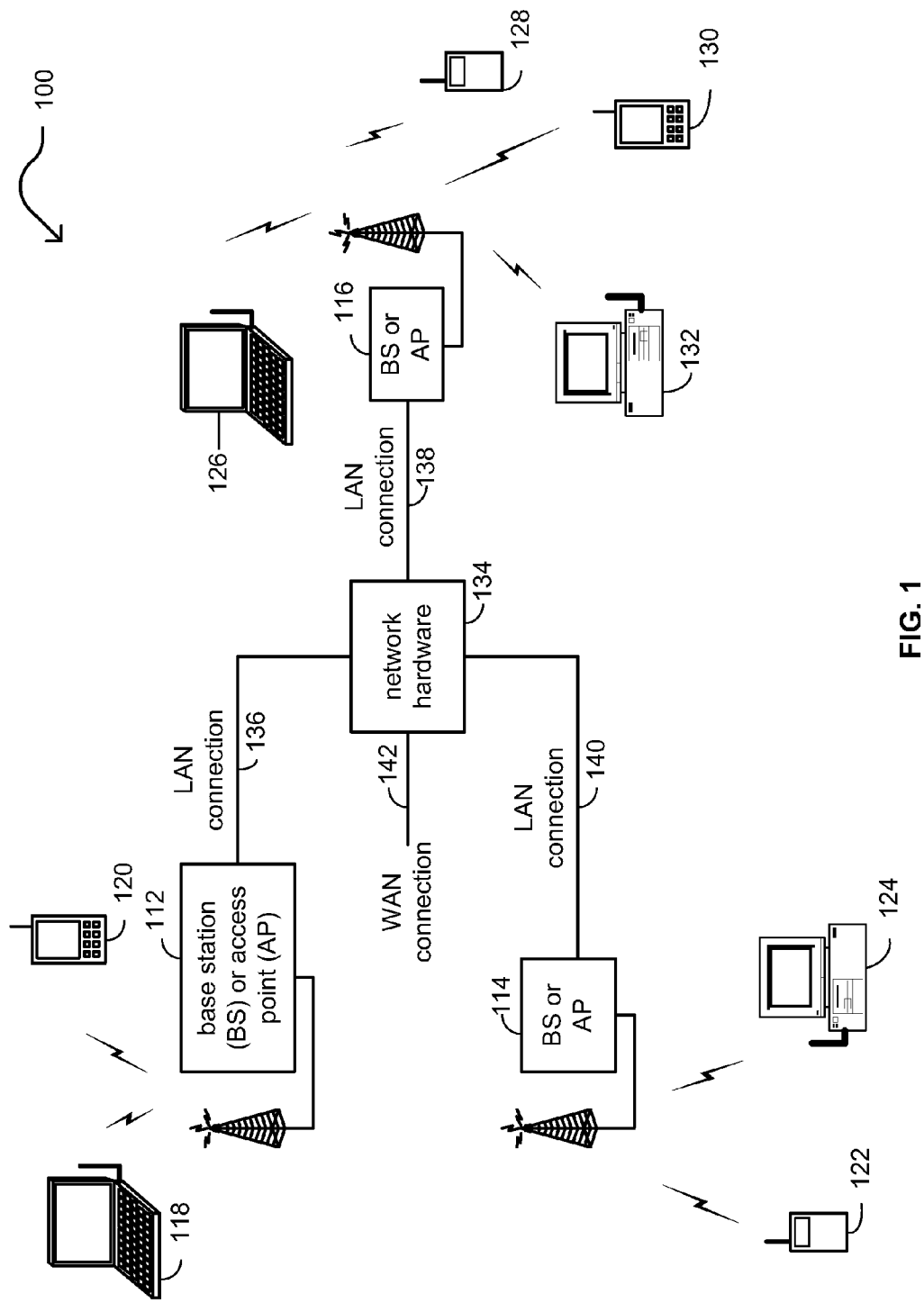
FIG. 1 is a diagram illustrating an embodiment of a wireless communication system.

FIG. 1 is a diagram illustrating one or more embodiments of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor implemented within one of the devices (e.g., any one of the WDEVs 118-132 and BSs or APs 112-116) is configured to process one or more signals received from and/or to generate one or more signals to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210", or devices 210-234 when referring to wireless communication devices 210-234; or with respect to FIG. 3 below, use of "device 310" may alternatively be used when referring to wireless communication device 310, or "devices 390 and 391 (or 390-391)" when referring to wireless communication devices 390 and 391 or WDEVs 390 and 391).

The processor of any of the various devices, WDEVs 118-132 and BSs or APs 112-116, may be configured to process frames received from other of the devices and to generate frames for transmission to other of the devices. The processor may be configured to generate frames based on different frame formats (e.g., a first frame format, a second frame format, and/or even additional frame formats). Also, the processor may be configured to encode data using any desired error correction code (ECC) and/or forward error correction (FEC) to generate encoded data to be placed within one or more frames to be transmitted to one or more other devices. In an example of operation, the processor is configured to generate a frame for transmission to first and second other devices based on selecting a first or second frame format. The processor is configured to encode first data intended for a first other device and to encode second data intended for a second node device. The processor is configured to generate a frame that includes both the first and second encoded data based on the selected frame format.

In one frame format, the frame includes a single preamble followed by the first and second encoded data. The single preamble specifies one or more coding parameters by which the first and second encoded data are generated. The processor may generate the first and second encoded data using one or more common coding parameters and/or one or more different coding parameters. In another frame format, the frame includes an initial preamble followed by the first and second encoded data and one or more sub-preambles that respectively precede the first and second encoded data. For example, a first sub-preamble may precede the first encoded data, and a second sub-preamble may precede the second encoded data. In this frame format, the initial preamble and/or the one or more sub-preambles specify the various coding parameters by which the first and second encoded data are generated.

Once the frame is generated based on the selected frame format, the communication interface of the device is configured to transmit the frame to the first and second other devices. The frame includes the first data that is intended for the first other device and the second data that is intended for the second other device. The single preamble or the initial preamble and/or one or more sub-preambles specify the coding parameters for each of the respective first and second encoded data within the frame. A recipient device employs the initial preamble and/or one or more of the appropriate sub-preambles to process the encoded data intended for it (e.g., the first encoded data) in order to make estimates of that data (e.g., estimate of the first data). A recipient device is able to determine which encoded data portions of the frame are intended for it and also the particular coding parameters by which those encoded data portions have been generated based on the initial preamble and/or one or more of the appropriate sub-preambles.

Figure 2:
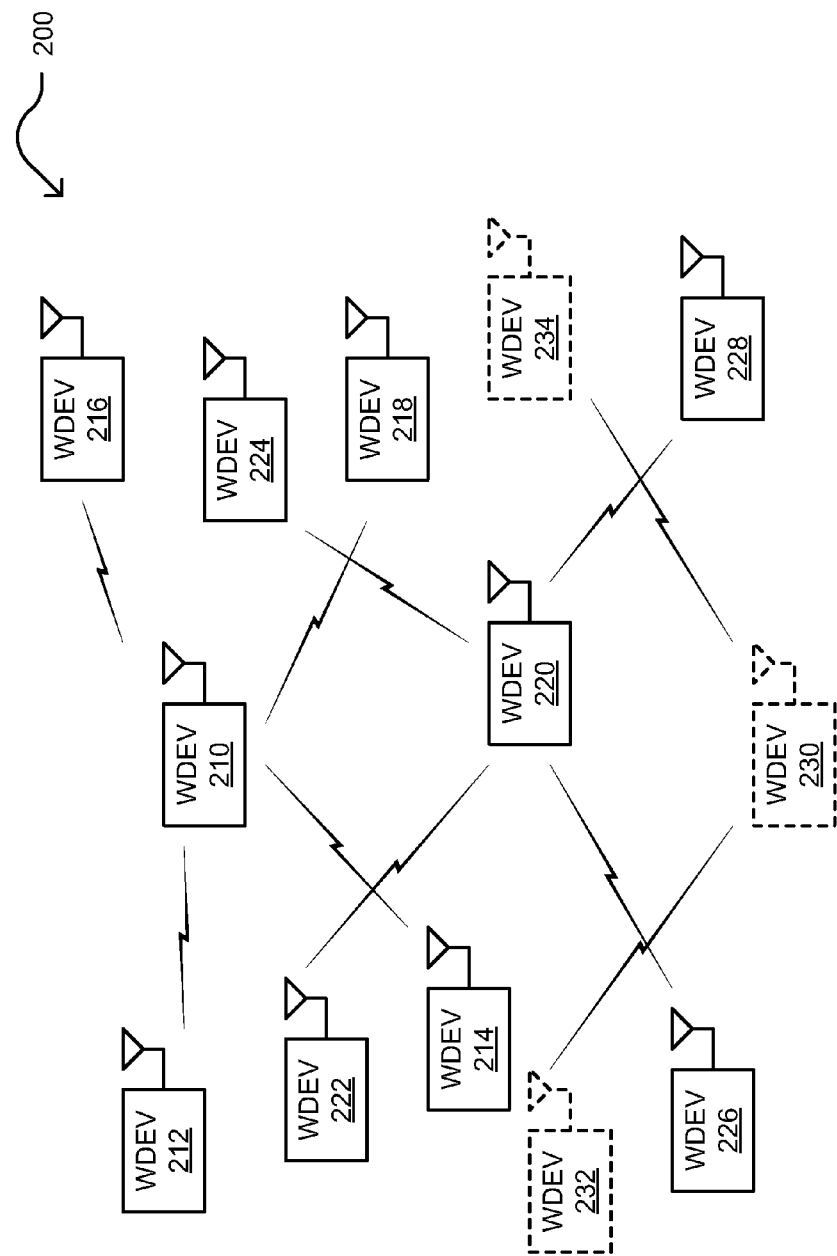
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, one or more additional APs or AP-operative STAs may be deployed, such as WDEV 230 that communicates with WDEVs 232 and 234 that are STAs. The STAs may be any type of wireless communication devices such as wireless communication devices 118-132, and the APs or AP-operative STAs may be any type of wireless communication devices such as BSs or APs 112-116. Different groups of the WDEVs 210-234 may be partitioned into different basic services sets (BSSs). In some instances, one or more of the WDEVs 210-234 are included within one or more overlapping basic services sets (OBSSs) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and AP are packed in a given area (e.g., which may be a relatively area [indoor or outdoor] with a high density of devices, such as a train station, airport, stadium, building, shopping mall, etc. to name just some examples). Large numbers of devices operating within a given area can be problematic if not impossible using prior technologies.

Any of the various WDEVs (or generally, devices) 210-234 may be implemented to include a processor and a communication interface. Such a processor is configured to generate and process frames based on various frame formats. Such a communication interface is configured to transmit and receive such frames based on the various frame formats. This diagram shows a highly dense deployment of devices, and a processor within a given device is configured to generate frames that include data intended for two or more recipient devices within the highly dense deployment. The frame includes a single preamble or the initial preamble and/or one or more sub-preambles specify the coding parameters for each of the various encoded data portions within the frame. Each encoded data portion is intended for one or more recipient devices. In some instances, a given encoded data portion is intended for only one recipient device, and in other instances, a given encoded data portion is intended for two or more recipient devices. Also, more than one encoded data portion within the frame may be intended for one or more of the recipient devices. In such a communication system having a highly dense deployment, the devices are able to generate frames for transmission to other of the devices in an efficient way such that the coding parameters to generate different encoded data may be signaled within the frame itself. There are instances in which different encoded data are generated using one or more common coding parameters, and a single preamble may be employed. In other instances, different encoded data are generated using different coding parameters, and the initial preamble and/or one or more sub-preambles specify the coding parameters for each of the various encoded data portions within the frame.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of one or more frames (e.g., using a transmitter 322 and a receiver 324). The wireless communication device 310 also includes a processor 330, and an associated memory 340, to execute various operations including interpreting one or more frames transmitted to wireless communication device 390 and/or received from the wireless communication device 390 and/or wireless communication device 391. The wireless communication devices 310 and 390 (and/or 391) may be implemented using one or more integrated circuits in accordance with any desired configuration or combination of components, modules, etc. within one or more integrated circuits. Also, the wireless communication devices 310, 390, and 391 may each include more than one antenna for transmitting and receiving of one or more frames (e.g., WDEV 390 may include m antennae, and WDEV 391 may include n antennae).

In one sample operation, the processor 330 is configured to select a first frame format or a second frame format. The processor 330 is also configured to encode first data using first one or more coding parameters to generate first encoded data. The processor 330 is also configured to encode second data using second one or more coding parameters to generate second encoded data. The processor 330 may be configured to perform forward error correction (FEC) and/or error correction code (ECC) of one or more bits to generate one or more coded bits (e.g., encode the first and second data to generate the first and second encoded data). Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The first data is intended for a first other wireless communication device 390, and the second data is intended for a second other wireless communication device 391.

Examples of coding parameters may include any one or more of modulation type, modulation coding set (MCS), coding type, code rate, beamforming parameter, spatial diversity configuration, frequency diversity configuration, space-time stream configuration, duration of at least one of the first data and the second data (e.g., note that boundaries between different user data portions may be aligned with OFDM/OFDMA symbols within the frame), short training field (STF), long training field (LTF), at least one orthogonal frequency division multiplexing (OFDM) or orthogonal frequency division multiple access (OFDMA) symbol boundary, and a number of OFDM or OFDMA symbols. The start of the respective recipient devices's encoded data may be indicated using multiple user (MU) signaling. The processor 330 may be configured to generate the first encoded data using a first combination of one or more such coding parameters and to generate the second encoded data using a second combination of one or more such coding parameters. In addition, different values and/or configurations of such coding parameters may be used to generate different encoded data.

Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.). Examples of beamforming parameters, spatial diversity configuration, frequency diversity configuration, and space-time stream configuration may include configuration of two or more antenna of the device 310, such as when implemented in a multiple-input-multiple-output (MIMO) configuration that includes multiple antennae for transmission and receipt of signals via multiple pathways. In this instance, the preamble may support channel estimation with different number of space-time streams for each recipient device.

An antenna array may be particularly weighted and adapted to beamform a transmission to a particular recipient device. Different antennae may be configured to communicate with different recipient devices using various configurations of spatial diversity and/or frequency diversity. Also, different space-time streams may be used for transmissions to different recipient devices. In some instances, two or more space-time streams may be used for transmission to a given recipient device. Note that the length of the first data and second data as well as the first encoded data and second encoded data may be different. The coding parameters may indicate the respective size of the first and second encoded data within the frame as well as the intended one or more recipients of each encoded data portion.

Any of the preambles (and/or sub-preambles) described herein may include one or more STFs and/or LTFs (e.g., possibly per user and/or per-transmit antenna in a MIMO capable device), signal fields (SIGs) may be included within such a frame and used for various purposes. Examples of such purposes can include synchronization, automatic gain control (AGC), channel estimation and/or characterization, and/or other purposes when operating in accordance with one or more communication protocols, standards, and/or recommended practices including any variation of IEEE 802.11. The coding parameters may also include any such information included within such signal field (SIG) as used in any variation of IEEE 802.11. Also, in a multiple user (MU) implementation with encoded data portions for different respective recipient devices, the frame may also include a per-user spatial mapping matrix.

Note also that the time difference due to different transmitter and receiver clocks may be accounted for when estimating a particular user's data starting time when processing a Shared PPDU. Alternatively, the starting time can be indicated in OFDM symbols. Also, per-user spatial mapping matrix may be signaled in an initial preamble in such a frame format that includes an initial preamble, so that each user can combine the initial LTF's with the appropriate coefficients to reach a channel estimate matched to the channel for its portion of the packet.

In an example of operation, when the first frame format is selected, the processor 330 is configured to generate a frame to include a single preamble followed by the first and second encoded data. The single preamble specifies the first and second one or more coding parameters. The first and second one or more coding parameters may include one or more (or sometimes all) common coding parameters.

In another example of operation, when the second frame format is selected, the processor 330 is configured to generate the frame to include an initial preamble followed by the first and second encoded data. A first sub-preamble precedes and is adjacent to the first encoded data, and a second sub-preamble precedes and is adjacent to the second encoded data. The initial preamble specifies one or more common coding parameters among the first and second one or more coding parameters. The first sub-preamble specifies at least one of the first one or more coding parameters that is not specified in the initial preamble, and the second sub-preamble specifies at least one of the second one or more coding parameters that is not specified in the initial preamble. The initial preamble and the first sub-preamble cooperatively specify all of the first one or more coding parameters used to generate the first encoded data, and the initial preamble and the second sub-preamble cooperatively specify all of the second one or more coding parameters used to generate the second encoded data.

When the frame has been generated based on either the first or second frame format, the communication interface 320 is configured to transmit the frame to first and second other wireless communication devices 390 and 391. The frame includes data for both of the devices 390 and 391. Depending on the manner of encoding and type of frame format selected, the manner in which the first and second encoded data have been generated is indicated within the single preamble or the initial preamble and/or one or more sub-preambles specify the coding parameters for each of the various encoded data portions within the frame. The frame includes data intended for two or more recipient devices and that data may be handled differently for the two or more recipient devices, and some or all of the coding parameters used to generate that data is indicated within the single preamble or the initial preamble and/or one or more sub-preambles.

FIG. 3B is a diagram illustrating another example 302 of communication between wireless communication devices. The communication interface 320 of WDEV 310 is configured to receive a first signal from a first other wireless communication device (e.g., WDEV 390). The processor 330 of WDEV 310 is configured to generate a frame based on a selected frame format (e.g., selected from the first or second frame formats), and the communication interface 320 of WDEV 310 is configured to transmit that frame to first and second other WDEVs 390 and 391. Note that any number of additional devices may be within the radiation pattern generated by transmission of the frame from device 310. When such a non-intended recipient device detects the frame, that device may process at least one of the single preamble or the initial preamble and/or one or more sub-preambles to determine whether or not the frame includes data intended for it. If the frame includes no data intended for it as determined by processing the single preamble or the initial preamble and/or one or more sub-preambles, that non-intended recipient device may discard the frame without fully processing it (e.g., which can also result in power or energy savings).

FIG. 3C is a diagram illustrating another example 303 of communication between wireless communication devices. The device 310 is configured to generate different frames (e.g., first, second, and third) for transmission to different groups of other devices. For example, the device 310 is configured to generate a first frame and to transmit that frame to devices 391 through 392. The device 310 is also configured to generate a second frame and to transmit that frame to devices 390 through 391, and the device 310 is configured to generate a third frame and to transmit that frame to devices 392 through 393. Note that the different respective frames may be based on the same or different frame formats. Also, two or more frames may share a common frame format. The device 310 is configured to generate different frames for transmission to different groups of devices and to generate different frames based on different frame formats. Also, a recipient device, such as device 391, is configured to receive different frames addressed to different groups of devices that may also have the same or different frame formats. A given group of recipient devices may be any combination of the various other devices within the system, and any given recipient device may be included in more than one recipient group.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and frames. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include data intended for one or more recipient devices. Note that such modulation symbol may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) (shown in right hand side of FIG. 4A) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system, one or more OFDM symbols or OFDM frames are transmitted between a transmitter device and a receiver device, and all of the sub-carriers or tones are dedicated for use in transmitting modulated data between the transmitter and receiver devices. In a multiple user system, one or more OFDM symbols or OFDM frames are transmitted between a transmitter device and multiple recipient or receiver devices, and the various sub-carriers or tones may be mapped to different respective receiver devices. FIG. 4B shows an example where first sub-carrier(s)/tone(s) may be assigned to a user 1, second sub-carrier(s)/tone(s) may be assigned to a user 2, and so on up to any desired number of users. In this example 402, the respective groups of sub-carrier(s)/tone(s) assigned to the different respective users are contiguous. However, any desired mapping of the sub-carriers/tones within a multiple user system may be performed including a noncontiguous implementation such as described below with respect to FIG. 4C.

FIG. 4C is a diagram illustrating another example 403 of OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first frame, a second assignment for second frame, etc.). An OFDM frame may include more than one OFDM symbol. Similarly, an OFDMA frame may include more than one OFDMA symbol. In addition, such sub-carrier/tone assignment may be dynamic among different respective symbols within a given frame or superframe (e.g., a first assignment for a first OFDMA symbol within a frame, a second assignment for a second OFDMA symbol within the frame, etc.). Generally speaking, an OFDMA symbol is a particular type of OFDM symbol, and general reference to OFDM symbol herein includes both OFDM and OFDMA symbols (and general reference to OFDM frame herein includes both OFDM and OFDMA frames).

Generally, a communication device may be configured to include a processor configured to process received OFDM or OFDMA symbols and/or frames and to generate such OFDM or OFDMA symbols and/or frames. The processor of the communication device is configured to encode data for different respective recipient devices and to generate frames based on any of a number of different frame formats. The processor of the device may be configured to perform such frame generation that may be based on OFDM and/or OFDMA.

In wireless local area network (WLAN/WiFi) related applications, aggregated MAC (media access control) data protocol units (A-MPDUs) may be used to increase efficiency of the communication system. Multiple MPDUs are present in an A-MPDU, with PHY header (PHY preamble) being present only in the beginning of the A-MPDU. In such an example, every individual MPDU in an A-MPDU is destined for the same user, and each MPDU contains a MAC header.

However, a Shared Physical Layer Convergence Procedure (PLCP) Protocol Data Unit (PPDU) Protocol Data Unit (PPDU) is a different type of frame or data unit that allows multiple users to share same frame. This sharing may be performed over time, and it will require less overhead due to possibly only single preamble. There is no overhead due to channel access protocol with multiple users accessing the channel in series.

A shared PPDU can be applied on top of (in addition to) other techniques for multiplexing users in a frame, e.g. on top of multi-user multiple-input-multiple-output (MU-MIMO) or OFDMA (sharing in the spatial and/or frequency domains) in both the uplink (UL) and downlink (DL) directions. Multiple users may be multiplexed together in the spatial domain or frequency domains followed by different users in the spatial or frequency domains.

Figures 5A, 5B:
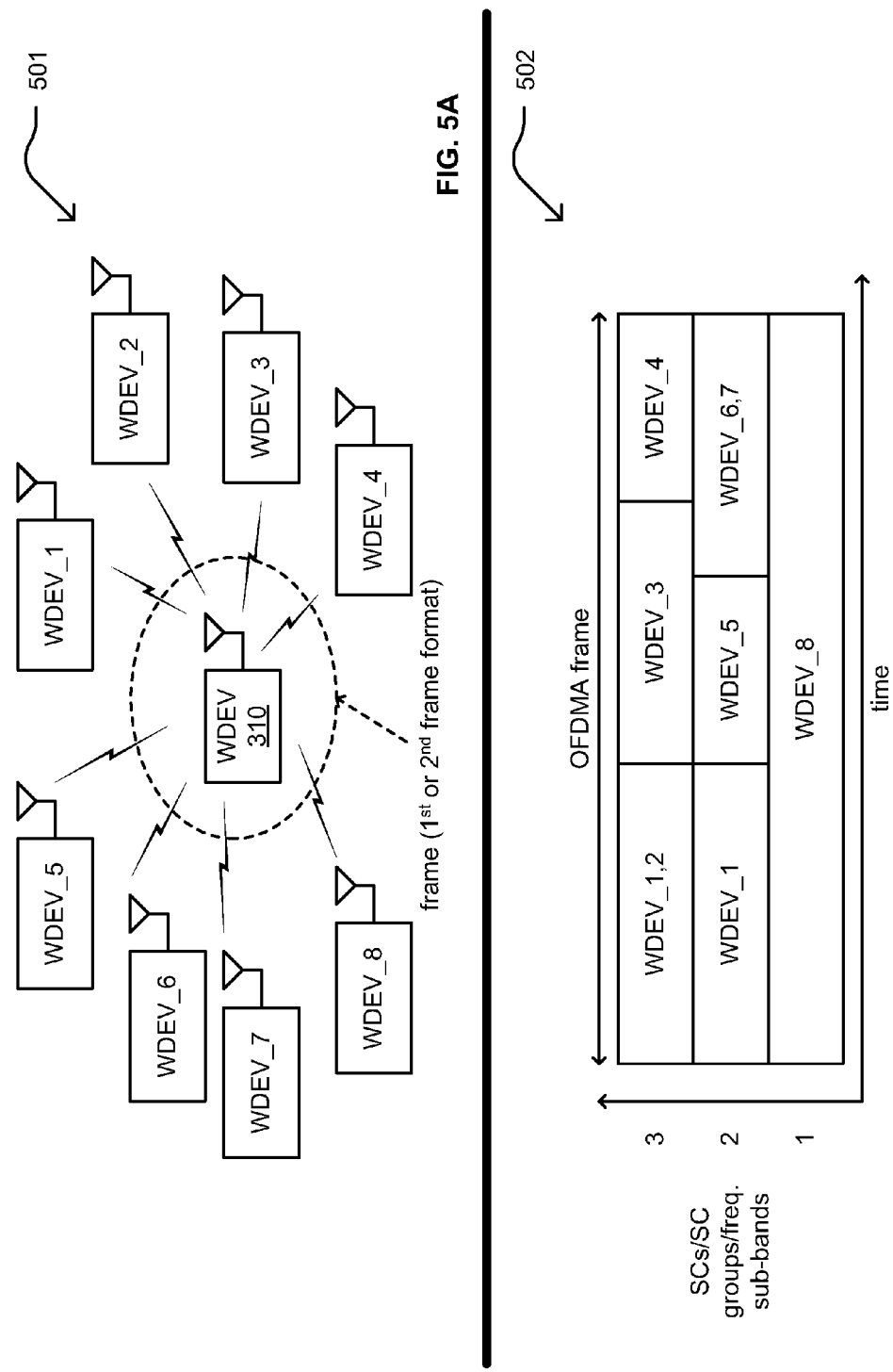
FIG. 5A is a diagram illustrating an example of a device transmitting a frame to other devices.
FIG. 5B is a diagram illustrating an example of an OFDMA frame.

FIG. 5A is a diagram illustrating an example 501 of a device transmitting a frame to other devices. In this diagram, device 310 generates a frame based on the selected frame format (e.g., selected as being either a first frame format or a second frame format) and transmits that frame to multiple recipient devices, shown as WDEVs_1-8 in the diagram. The frame includes data for each of the recipient devices WDEVs_1-8.

FIG. 5B is a diagram illustrating an example 502 of an OFDMA frame. This diagram shows an example of the frame transmitted from device 310 in FIG. 5A where users are multiplexed in the time (shared PPDU), frequency (using OFDMA techniques) and spatial (using MU-MIMO techniques) domains.

The frame is split into 3 frequency subbands (using OFDMA techniques). Each frequency sub-band may be viewed as a respective one or more sub-carriers. Each subband contains shared PPDU for different users and some of those PPDU share 2 users in the spatial domain using MU-MIMO signaling techniques. Users #1,2 (e.g., shown as WDEV_1,2) share the same time (symbols) and frequency subband and so do users #6,7. Separating these users by diversity based on spatial diversity, frequency diversity, and/or first space-time stream configuration may be done via MU-MIMO techniques.

Below, various other examples are presented to focus on details for PPDU sharing in a frame or a given subband and are similarly applicable when sharing in the frequency and spatial domains are added.

Various examples of frame formats or shared PLCP Protocol Data Unit (PPDU) types are presented below. In one implementation, there are two types of frame formats or Shared PPDU.

A first frame format includes a single preamble without any additional per user information after the preamble or during the rest of the Shared PPDU. For example, this may be similar to a normal A-MPDU, except that each MPDU can be addressed to any user (e.g., a first MPDU for a first user, a second MPDU for a first user, a third MPDU for both first and second users, etc.). Multiple users share an A-MPDU, except that each A-MPDU has at least one MPDU per user and there are at least two users per A-MPDU. A second frame format includes an initial preamble with additional per user preamble may be used having information after the initial preamble and during the rest of the Shared PPDU.

Various features of multiple user signaling in a shared PPDU are presented below. Multiple user signaling in a Shared PPDU may be achieved through a variety of ways including: (1) management frames transmitted preceding the data frame transmission, (2) management frames indicating GID membership with GID (Group ID) signaling in the data frame, similar to Downlink MU in the IEEE 802.11ac standard, and/or (3) complete information for multiple users in an initial preamble (e.g., in SIG Field(s)). Start of the various user preambles, sub-preambles, and/or data portions may be indicated through multiple user signaling.

Multiple user signaling in a Shared PPDU may contain the following information: (1) users identification that is present in a Shared PPDU, (2) position of each user's information (data or data and preamble portion) within the shared A-MPDU, (3) duration (length) of the data of each user in Shared PPDU, (4) Information about parameters such as MCS, Coding Type, Code Rate, Diversity, etc. such as in typical WLAN SIG Field(s), and/or (5) difference in per-user RX power compared to RX power during initial STF. With respect to the difference in per-user RX power compared to RX power during initial STF, such information may allow each RX to adjust its gain control without requiring a per-user STF. A transmitter device could then be implemented to estimate the effect of each per-user spatial mapping matrix, including array gain.

For users with periodic and predictable type of traffic (e.g. VoIP, surveillance video, etc.), multiple user signaling may be compressed further using pre-defined signaling templates. Signaling templates are a condensed form of describing repetitive signal field (SIG) parameters for users in a shared PPDU. For example, users in a shared PPDU may use the same modulation coding set (MCS), code rate, or duration. Instead of repeating this information for every user, this could be mentioned only once per shared PPDU, and all users in this shared PPDU would use the same value. Alternatively, a shared PPDU with a particular set of parameters may be sent periodically over time, e.g. for VoIP traffic. Instead of describing these parameters explicitly, such information can be indicated with a template index that points to one or more default values for these parameters.

Several of the following diagrams show various options by which frames may be generated based on various frame formats. Frame formats may include a single preamble or an initial preamble and/or one or more sub-preambles in various configurations. In FIG. 6A, FIG. 6B, FIG. 6C, and FIG. 6D, OFDMA frame formats are shown such that all of the sub-carriers at any given time are assigned to a common element, such as the initial preamble and/or the one or more sub-preambles, and various user data portions (identified in the diagram as WDEV_1 through WDEV_8, where WDEV_1 corresponds to encoded data intended for a first device, WDEV_1, and where WDEV_2 corresponds to encoded data intended for a second device, WDEV_2, etc.).

FIG. 6A is a diagram illustrating another example 601 of an OFDMA frame. This diagram shows a frame that includes a single preamble followed by a number of encoded data portions, shown as WDEV_1 through WDEV_8. All of the sub-carriers are used for a respective portion of the frame at any given time or for one or more OFDMA symbols. For example, all of the sub-carriers are used for the single preamble during a first period of time or for first one or more OFDMA symbols, then all the sub-carriers are used for first encoded data, WDEV_1, during a second period of time or for second one or more OFDMA symbols, and so on for the remainder of the frame. The single preamble specifies the one or more coding parameters by which each of the various encoded data portions have been generated. This single preamble may specify different coding parameters for the different encoded data portions. In some instances, a common set of coding parameters are used to generate all of the encoded data portions of the frame.

FIG. 6B is a diagram illustrating another example 602 of an OFDMA frame. In the frame format of this diagram, an initial preamble specifies one or more common coding parameters used for each of the encoded data portions, WDEV_1 through WDEV_8. Then, a respective sub-preamble is included in the frame in front of and adjacent to each of the encoded data portions. For example, a first sub-preamble (SP1) precedes and is adjacent to the first encoded data portion, WDEV_1. A second sub-preamble (SP2) precedes and is adjacent to the second encoded data portion, WDEV_2. In this frame format, a respective sub-preamble precedes each of the respective data portions. A given sub-preamble specifies one or more coding parameters that has not already been described in the initial preamble that pertains to the following data portion. For example, the first encoded data portion, WDEV_1, is generated using one or more common coding parameters specified in the initial preamble and also using one or more other coding parameters specified in the first sub-preamble (SP1). Analogously, the second encoded data portion, WDEV_2, is generated using one or more common coding parameters specified in the initial preamble and also using one or more other coding parameters specified in the second sub-preamble (SP2). This is a partially distributed implementation of coding parameter information among the frame.

FIG. 6C is a diagram illustrating another example 603 of an OFDMA frame. In the frame format of this diagram, an initial preamble also specifies one or more common coding parameters used for all of the encoded data portions, WDEV_1 through WDEV_8. However, the frame format of this diagram does not include a first sub-preamble (SP1) that precedes and is adjacent to the first encoded data portion, WDEV_1. Instead, any specific one or more coding parameters used to generate the first encoded data portion, WDEV_1, are also included in the initial preamble along with the one or more common coding parameters. The frame format of this diagram is similar to the frame format of FIG. 6B with at least one difference being that any specific information related to the first encoded data portion, WDEV_1, is also included in the initial preamble thereby obviating the need for the first sub-preamble (SP1).

FIG. 6D is a diagram illustrating another example 604 of an OFDMA frame. In the frame format of this diagram, an initial preamble also specifies one or more common coding parameters used for all of the encoded data portions, WDEV_1 through WDEV_8. However, the frame format of this diagram does not necessarily include a respective sub-preamble for each of the respective data portions. Only certain encoded data portions are preceded by a respective sub-preamble. In this example, the third encoded data portion, WDEV_3, is generated using one or more common coding parameters specified in the initial preamble and also using one or more other coding parameters specified in the third sub-preamble (SP3). Note that the other encoded data portions are not preceded by a respective sub-preamble. All of the coding parameters used to generate the other encoded data portions are described in the initial preamble at the beginning of frame. Only one or more selected encoded data portions are preceded by a sub-preamble that specifies at least one additional coding parameter by which one or more selected encoded data portions have been generated.

FIG. 7A, FIG. 7B, FIG. 7C, and FIG. 7D also show various examples of OFDMA frame formats. However, in these diagrams, additional frequency diversity is provided by partitioning the various sub-carriers of the OFDMA frame. At any given time or for one or more OFDMA symbols within the frame, different groups of sub-carriers may be assigned for different frame elements (e.g., initial preamble, sub-preambles, encoded data portions, etc.). As can be seen within these diagrams, an additional level of diversity is achieved by assigning different groups of sub-carriers for different uses at different times or for different OFDMA symbols within the frame.

FIG. 7A is a diagram illustrating another example 701 of an OFDMA frame. This diagram shows some similarities to FIG. 5B with at least one difference being that a single preamble is shown as preceding the encoded data portions, WDEV_1 through WDEV_8. The single preamble specifies the one or more coding parameters by which each of the various encoded data portions have been generated. This single preamble may specify different coding parameters for the different encoded data portions. In some instances, a common set of coding parameters are used to generate all of the encoded data portions of the frame. The various encoded data portions are modulated within different groups of sub-carriers within the OFDMA frame. Note also that the lengths or durations of the various encoded data portions are not necessarily the same, and that certain encoded data portions are intended for more than one recipient (e.g., WDEV_1, 2 intended for users 1, 2).

FIG. 7B is a diagram illustrating another example 702 of an OFDMA frame. In the frame format of this diagram, an initial preamble also specifies one or more common coding parameters used for all of the encoded data portions, WDEV_1 through WDEV_8. In this diagram, a respective sub-preamble precedes and is adjacent to each of the respective encoded data portions. The one or more common coding parameters specified in the initial preamble and one or more additional coding parameters specified in a respective sub-preamble specifies all of the coding parameters by which a given encoded data portion has been generated.

FIG. 7C is a diagram illustrating another example 703 of an OFDMA frame. In the frame format of this diagram, an initial preamble also specifies one or more common coding parameters used for all of the encoded data portions, WDEV_1 through WDEV_8. In this diagram, a respective sub-preamble precedes and is adjacent to each of the respective encoded data portions with the exception of those encoded data portions immediately following the initial preamble. The frame format of this diagram does not include a sub-preamble (SP1,2) that precedes and is adjacent to the encoded data portion, WDEV_1,2. This frame format also does not include a sub-preamble (SP1) that precedes and is adjacent to the encoded data portion, WDEV_1, or a sub-preamble (SP8) that precedes and is adjacent to the encoded data portion, WDEV_8. Any specific one or more coding parameters used to generate the encoded data portion, WDEV_1,2, the encoded data portion, WDEV_1, and the encoded data portion, WDEV_8 are also included in the initial preamble along with the one or more common coding parameters.

FIG. 7D is a diagram illustrating another example 704 of an OFDMA frame. In the frame format of this diagram, an initial preamble also specifies one or more common coding parameters used for all of the encoded data portions, WDEV_1 through WDEV_8. However, the frame format of this diagram does not necessarily include a respective sub-preamble for each of the respective data portions. For example, a sub-preamble precedes and is adjacent to a given encoded data portion only when needed, and the frame format of this example does not include a specific sub-preamble for the encoded data portions, WDEV_4, WDEV_6,7 (e.g., data intended for both users 6, 7), and WDEV_8. As can be seen in this diagram, only selected encoded data portions, but not all encoded data portions, are preceded by a respective sub-preamble that specifies one or more additional coding parameters by which that encoded data portion has been generated and that has not been specified in the initial preamble.

In the diagrams of FIG. 6A-FIG. 7D, note that the respective lengths or durations of the various encoded data portions need not necessarily be the same. Different encoded data portions may be of different durations or lengths, and any given encoded data portion may be intended for more than one recipient device in certain embodiments. In addition, the respective lengths or durations of the various single preambles, initial preambles, and/or sub-preambles need not necessarily be the same in all embodiments, and their respective lengths may vary as a function of the amount of information included therein. In other embodiments, the respective durations or lengths of any given element within the frame (e.g., single preambles, initial preambles, and/or sub-preambles, and/or encoded data portion) may be fixed (e.g., a first fixed duration/length for any single preamble, the first or a second fixed duration/length for any initial preambles, a third fixed duration/length for any sub-preambles, and a fourth fixed duration/length for any encoded data portion).

Note also that, in some embodiments, any respective sub-preamble may also be implemented to include one or more of the following fields: STFs, LTFs, SIG Field(s). The boundaries between the various sub-preambles and encoded data portions (e.g., between SP1, encoded data portion, WDEV_1, and SP2, etc.) may be aligned with the OFDM and OFDMA symbol boundaries. Before each respective encoded data portion in a frame (e.g., Shared PPDU there), in some frame formats, there may also a sub-preamble portion that operates cooperatively with the initial preamble that is located at the start of the Shared PPDU.

Within any preamble and/or sub-preamble portions, an included STF may be used for ACG adjustment and synchronization. Any included LTFs may be used for channel estimation and may also allow for use of multiple space-time streams. Additional per user information may also be included (e.g., one or more signal fields (SIGs)).

If desired, a given preamble portion can be implemented using a fixed pattern (e.g., such as always including STF/LTF/one symbol SIG). Alternatively, a given preamble portion can be implemented using a variable pattern specified by bits in the SIG (e.g., a SIG that is followed by nothing, or by some particular sequence such as STF/1 LTF or STF/2 LTF's). The Initial preamble may include first user's information (e.g., information for WDEV_1), or a first user's specific information could come immediately after initial preamble.

Figure 8A:
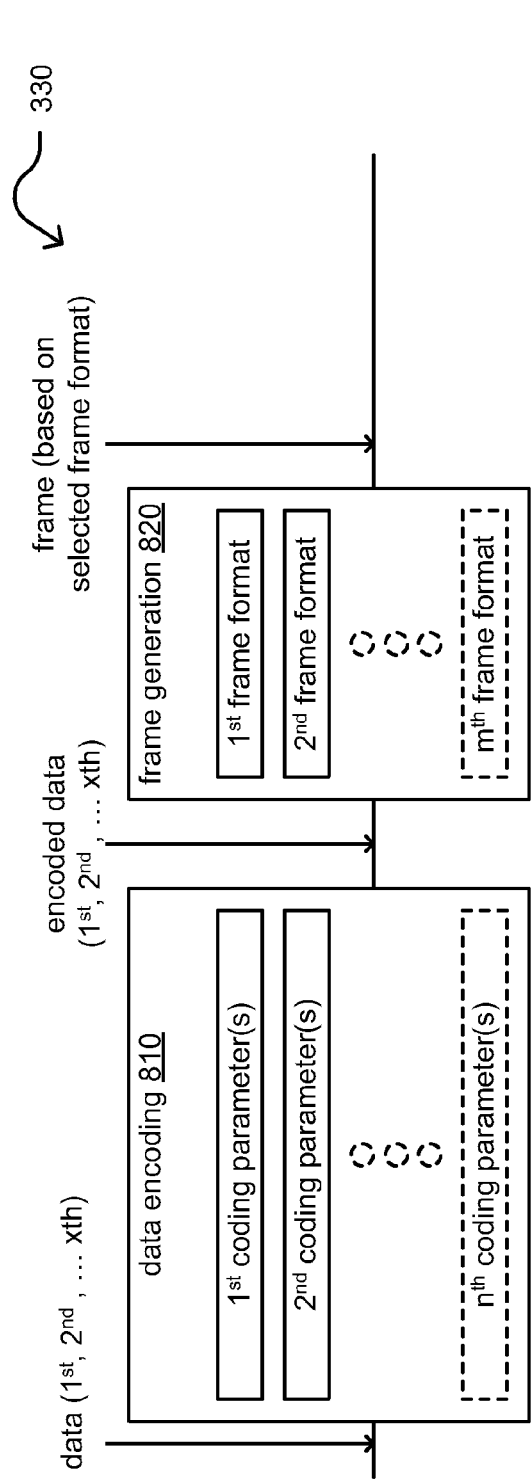
FIG. 8A is a diagram illustrating an example of operations performed by a processor within a wireless communication device.

FIG. 8A is a diagram illustrating an example 801 of operations performed by a processor within a wireless communication device. Generally, the processor performs data encoding 810 and frame generation 820. The processor receives data corresponding to various users (e.g. first user, second user, and so on up until xth user). The processor then encodes (data encoding 810) the various data corresponding to the various users to generate encoded data. The processor may perform the encoding of the data based on any of a number of different coding parameters (e.g., coding parameter(s) 1, 2, . . . n). The encoding may be performed using different sets of one or more coding parameters for each of the respective users. Any combination of coding parameters may be used to generate encoded data for any respective user. Examples of coding parameters may include but are not limited by any one or more of modulation type, MCS, coding type, code rate, beamforming parameter, spatial diversity configuration, frequency diversity configuration, space-time stream configuration, duration of at least one of the first data and the second data, STF, LTF, at least one OFDM or OFDMA symbol boundary, and a number of OFDM or OFDMA symbols.

The processor then generates one or more frames based on the encoded data (frame generation 820). Note that different groups of encoded data corresponding to different groups of users may be included within different frames. The processor may generate the frames based on any of a number of different frame formats (e.g., frame formats 1, 2, . . . m). When a frame has been generated, the frame is passed to a communication interface of the device for transmission to one or more other devices.

Figure 8B:
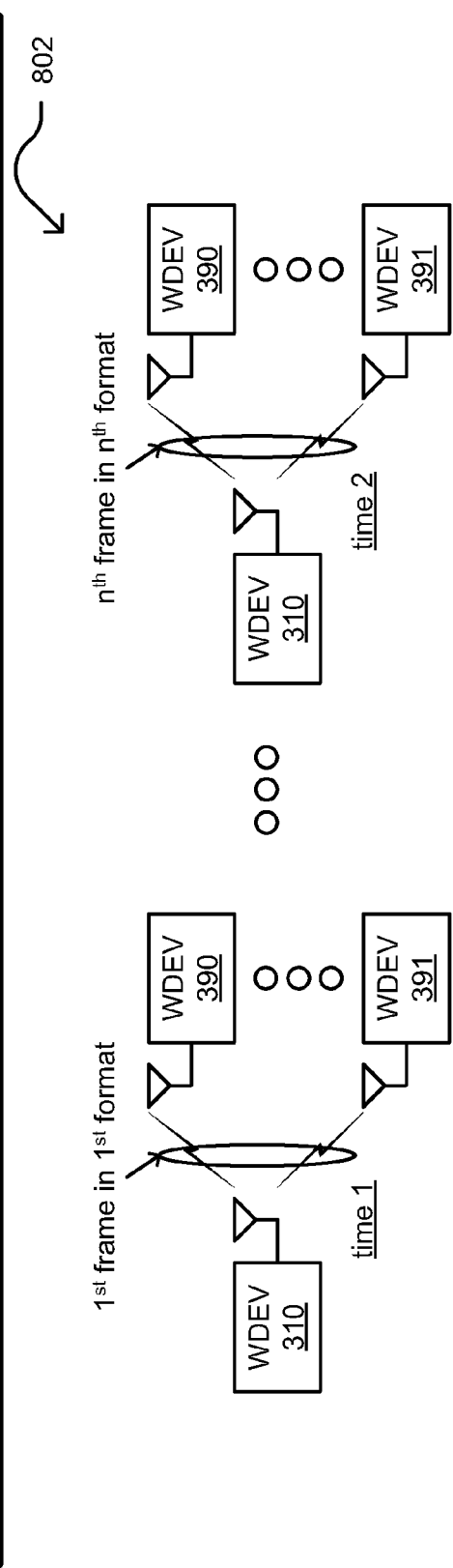
FIG. 8B is a diagram illustrating an example of a device transmitting different frames having different frame formats to other devices.

FIG. 8B is a diagram illustrating an example 802 of a device transmitting different frames having different frame formats to other devices. About, with respect to FIG. 3C, the device 310 is shown and described as being configured to generate different frames (e.g., first, second, and third) for transmission to different groups of other devices. In this diagram, the device 310 is configured to generate different frames based on different frame formats for transmission to a common group of devices 390 through 391. At or during the first time, the device 310 is configured to generate a first frame having a first frame format for transmission to the devices 390 through 391. Then, at or during a second time, the device 310 is configured to generate a second frame having a second frame format for transmission to those same devices 390 through 391. The example 802 of this diagram and the example 303 FIG. 3C may be combined to generate different respective frames having different frame formats for transmission to different groups of other devices as well. This diagram generally shows a group of devices 390 through 391 receiving different frames having different frame formats at different times, and generally, the device 310 may be configured to generate different frames having different frame formats for transmission to different one or more other devices at different times.

Note also that the selectivity within the device 310 of choosing a particular frame format and/or group of recipient devices may be made independently by the device 310 or cooperatively with one or more of the other devices within the system. For example, the device 310 may generate a frame having a particular frame format for a particular group of recipients based on prior communications between one or more other devices and the device 310. These one or more other devices may request transmission of certain data or information and, if desired, in a particular frame format, from the device 310 and the prior communication, and then the device 310 may generate a frame that includes such requested data or information and, if desired, in the particular frame format, and then transmit that frame to the one or more other devices.

Figures 9A, 9B:
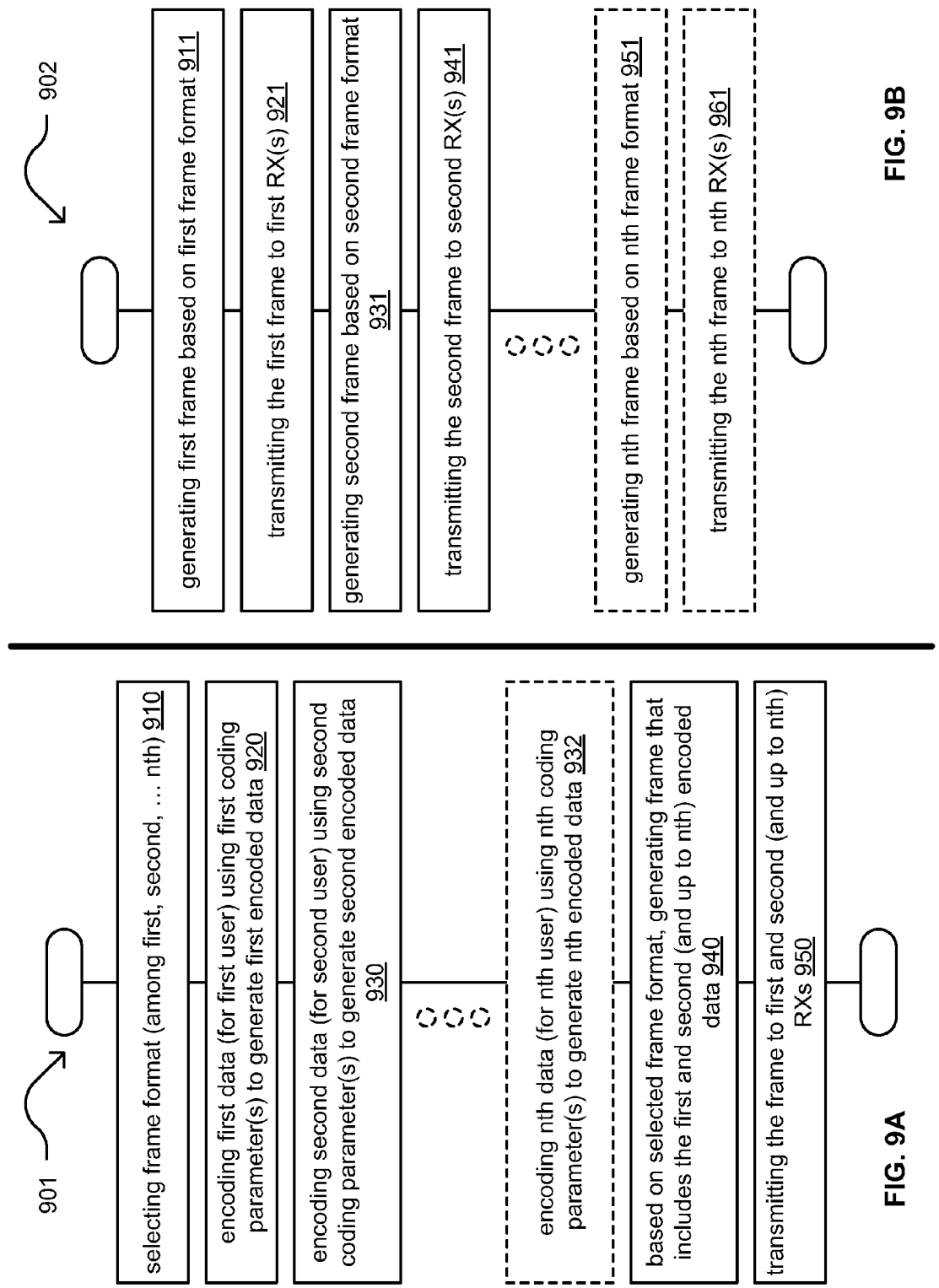
FIG. 9A is a diagram illustrating an embodiment of a method for execution by one or more wireless communication devices.
FIG. 9B is a diagram illustrating another embodiment of a method for execution by one or more wireless communication devices.

FIG. 9A is a diagram illustrating an embodiment of a method 901 for execution by one or more wireless communication devices. The method 901 begins by selecting a first frame format or a second frame format (e.g., from among a first, second, and up to nth frame format) (block 910). The method 901 continues by encoding first data using first one or more coding parameters to generate first encoded data (block 920), and the method 901 then operates by encoding second data using second one or more coding parameters to generate second encoded data (block 930). The first data is intended for a first other wireless communication device, and the second data is intended for a second other wireless communication device. In some embodiments, the method 901 can operate by encoding additional data (e.g., nth data) using nth one or more coding parameters to generate nth encoded data (block 932). Generally, any number of user data may undergo encoding using any combination of one or more coding parameters to generate any such number of encoded data. The method 901 then generates a frame that includes the encoded data based on the selected frame format (block 940).

In one example, when the first frame format is selected, the method 901 operates by generating a frame to include a single preamble followed by the first and second encoded data. In this example, the single preamble specifies the first and second one or more coding parameters.

In another example, when the second frame format is selected, the method 901 continues by generating the frame to include an initial preamble followed by the first and second encoded data. In this example, a first sub-preamble precedes and is adjacent to the first encoded data, and a second sub-preamble precedes and is adjacent to the second encoded data. The initial preamble specifies one or more common coding parameters among the first and second one or more coding parameters. However, the first sub-preamble specifies at least one of the first one or more coding parameters that is not specified in the initial preamble, and the second sub-preamble specifies at least one of the second one or more coding parameters that is not specified in the initial preamble.

Then, via a communication interface of the wireless communication device, the method 901 operates by transmitting the frame to one or more other wireless communication devices for which the encoded data within the frame is intended (block 950).

Note that variations of the method 901 may operate by generating different frame or frames at different times based on any number of different frame formats, and the method 901 may operate by transmitting such different frames to different groups of recipient other wireless communication devices at different times.

FIG. 9B is a diagram illustrating another embodiment of a method 902 for execution by one or more wireless communication devices.

The method 902 begins by generating a first frame based on a first frame format (block 911). The method 902 continues by transmitting the first frame to a first one or more recipient other wireless communication devices (RX(s)) (block 921).

The method 902 then operates by generating a second frame based on a second frame format (block 931). The method 902 continues by transmitting the second frame to a second one or more recipient other wireless communication devices (RX(s)) (block 941).

If desired, additional frames may be generated based on additional frame formats and transmitted to additional one or more recipient other wireless communication devices (RX(s)).

For example, the method 902 may then operate by generating an nth frame based on an nth frame format (block 951). The method 902 would then continue by transmitting the nth frame to nth one or more recipient other wireless communication devices (RX(s)) (block 961).

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a processor configured to:
select a first orthogonal frequency division multiple access (OFDMA) frame format or a second OFDMA frame format from a plurality of OFDMA frame formats;
encode first data intended for a first other wireless communication device using first one or more coding parameters to generate first encoded data;
encode second data intended for a second other wireless communication device using second one or more coding parameters to generate second encoded data;
when the first OFDMA frame format is selected, generate an OFDMA frame to include a single preamble within an OFDMA band that is adjacently followed by the first encoded data within a first sub-band of the OFDMA band and also adjacently followed by the second encoded data within a second sub-band of the OFDMA band, wherein the single preamble specifies the first and second one or more coding parameters used to encode the first data and the second data;
when the second OFDMA frame format is selected, generate the OFDMA frame to include an initial preamble followed by the first and second encoded data, wherein a first sub-preamble precedes and is adjacent to the first encoded data, and a second sub-preamble precedes and is adjacent to the second encoded data, wherein the initial preamble specifies one or more common coding parameters among the first and second one or more coding parameters that are commonly used to encode the first data and the second data, the first sub-preamble specifies at least one of the first one or more coding parameters that is used to encode the first data and that is not specified in the initial preamble, and the second sub-preamble specifies at least one of the second one or more coding parameters that is used to encode the second data and that is not specified in the initial preamble;
generate a first other OFDMA frame based on the first OFDMA frame format and
generate a second other OFDMA frame based on the second OFDMA frame format:
a communication interface configured to:
transmit the OFDMA frame to the first other wireless communication device and the second other wireless communication device;
transmit the first other OFDMA frame to a first plurality of other wireless communication devices; and
transmit the second other OFDMA frame to a second plurality of other wireless communication devices.

2. The wireless communication device of claim 1, wherein:
at least one of the first other wireless communication device or the second other wireless communication device includes a laptop computer, a tablet, a personal digital assistant, a personal computer, or a cellular telephone.

3. The wireless communication device of claim 1, wherein, when the OFDMA frame is based on the second OFDMA frame format, the OFDMA frame includes the first data modulated within first one or more sub-carriers of the OFDMA frame and the second data modulated within second one or more sub-carriers of the OFDMA frame.

4. The wireless communication device of claim 1, wherein, when the OFDMA frame is based on the second OFDMA frame format, the OFDMA frame includes:
 the first or the second encoded data modulated within first one or more sub-carriers of the OFDMA frame; and
 other encoded data, which includes data for two or more other wireless communication devices, modulated within second one or more sub-carriers of the OFDMA frame.

5. The wireless communication device of claim 1, wherein, when the second OFDMA frame format is selected, the processor is further configured to:
 encode third data using third one or more coding parameters to generate third encoded data; and
 generate the OFDMA frame to include the initial preamble followed by third encoded data that is followed the first and second encoded data, wherein the initial preamble specifies the one or more common coding parameters among the first and second one or more coding parameters and also specifies all of the third one or more coding parameters.

6. The wireless communication device of claim 1 further comprising:
 the processor configured to generate another OFDMA frame that includes a coding parameter definition field, wherein the first and second one or more coding parameters are interpreted based on the coding parameter definition field; and
 the communication interface configured to transmit the another OFDMA frame to the first and second other wireless communication devices before transmitting the OFDMA frame to the first and second other wireless communication devices.

7. The wireless communication device of claim 1 further comprising:
 the processor configured to:
  encode the first data using the first one or more coding parameters to generate the first encoded data, wherein the first one or more coding parameters includes at least one of first modulation type, first modulation coding set (MCS), first coding type, first code rate, first beamforming parameter, first spatial diversity configuration, first frequency diversity configuration, first space-time stream configuration, duration of at least one of the first data or the second data, first short training field (STF), first long training field (LTF), first OFDMA symbol boundary, or first number of OFDMA symbols; and
  encode the second data using the second one or more coding parameters to generate the second encoded data, wherein the second one or more coding parameters include at least one of second modulation type, second MCS, second coding type, second code rate, second beamforming parameter, second spatial diversity configuration, second frequency diversity configuration, second space-time stream configuration, duration of at least one of the first data or the second data, second STF, second LTF, second OFDMA symbol boundary, or second number of OFDMA symbols.

8. The wireless communication device of claim 1 further comprising:
 an access point (AP), wherein at least one of the first or second other wireless communication devices includes a wireless station (STA).

9. A wireless communication device comprising:
 a communication interface configured to receive an orthogonal frequency division multiple access (OFDMA) frame transmitted from a first other wireless communication device; and
 a processor configured to:
  process the OFDMA frame to identify an OFDMA frame format of the OFDMA frame being a first frame OFDMA format or a second OFDMA frame format, wherein the OFDMA frame includes a single preamble within an OFDMA band that is adjacently followed by first encoded data within a first sub-band of the OFDMA band and also adjacently followed by second encoded data within a second sub-band of the OFDMA band based on the first OFDMA frame format, wherein the OFDMA frame includes an initial preamble followed by the first encoded data and the second encoded data such that a first sub-preamble precedes and is adjacent to the first encoded data and a second sub-preamble precedes and is adjacent to the second encoded data based on the second OFDMA frame format, wherein the first encoded data is intended for the wireless communication device and the second encoded data is intended for a second other wireless communication device;
  discard the second encoded data;
  when the first OFDMA frame format is identified, process the first encoded data using first one or more coding parameters that are specified in the single preamble to estimate first data; and
  when the second OFDMA frame format is identified, process the first encoded data using one or more common coding parameters among the first and second one or more coding parameters that are specified in the initial preamble and at least one additional coding parameter that is specified in the first sub-preamble and that is not specified in the initial preamble to estimate the first data.

10. The wireless communication device of claim 9, wherein the processor is further configured to:
 identify the first encoded data that is modulated within first one or more sub-carriers of the first OFDMA frame; and
 discard the second encoded data that is modulated within second one or more sub-carriers of the first OFDMA frame.

11. The wireless communication device of claim 9 further comprising:
 the communication interface configured to receive another OFDMA frame from the first other wireless communication device before receiving the OFDMA frame from the first other wireless communication device, wherein the another OFDMA frame includes a coding parameter definition field; and
 the processor configured to interpret at least one of the first or second one or more coding parameters based on the coding parameter definition field.

12. The wireless communication device of claim 9 further comprising:
the processor configured to decode the first encoded data using the first one or more coding parameters to estimate the first data, wherein the first one or more coding parameters includes at least one of modulation type, modulation coding set (MCS), coding type, code rate, beamforming parameter, spatial diversity configuration, frequency diversity configuration, space-time stream configuration, duration of the first data, short training field (STF), long training field (LTF), at least one OFDMA symbol boundary, or number of OFDMA symbols.

13. The wireless communication device of claim 9 further comprising:
a wireless station (STA), wherein the first other wireless communication device includes an access point (AP) or another STA.

14. A method for execution by a wireless communication device, the method comprising:
selecting a first orthogonal frequency division multiple access (OFDMA) frame format or a second OFDMA frame format from a plurality of OFDMA frame formats;
encoding first data intended for a first other wireless communication device using first one or more coding parameters to generate first encoded data;
encoding second data intended for a second other wireless communication device using second one or more coding parameters to generate second encoded data;
when the first OFDMA frame format is selected, generating an OFDMA frame to include a single preamble within an OFDMA band that is adjacently followed by the first encoded data within a first sub-band of the OFDMA band and also adjacently followed by the second encoded data within a second sub-band of the OFDMA band, wherein the single preamble specifies the first and second one or more coding parameters used to encode the first data and the second data;
when the second OFDMA frame format is selected, generating the OFDMA frame to include an initial preamble followed by the first and second encoded data, wherein a first sub-preamble precedes and is adjacent to the first encoded data, and a second sub-preamble precedes and is adjacent to the second encoded data, wherein the initial preamble specifies one or more common coding parameters among the first and second one or more coding parameters that are commonly used to encode the first data and the second data, the first sub-preamble specifies at least one of the first one or more coding parameters that is used to encode the first data and that is not specified in the initial preamble, and the second sub-preamble specifies at least one of the second one or more coding parameters that is used to encode the second data and that is not specified in the initial preamble;
via a communication interface of the wireless communication device, transmitting the OFDMA frame to the first other wireless communication device and the second other wireless communication devices, wherein the first data is intended for the first other wireless communication device;
generating a first other OFDMA frame based on the first OFDMA frame format via the communication interface of the wireless communication device, transmitting the first OFDMA other frame to a first plurality of other wireless communication devices;
generating a second other OFDMA frame based on the second OFDMA frame format and
via the communication interface of the wireless communication device, transmitting the second other OFDMA frame to a second plurality of other wireless communication devices.

15. The method of claim 14, wherein:
at least one of the first other wireless communication device or the second other wireless communication device includes a laptop computer, a tablet, a personal digital assistant, a personal computer, or a cellular telephone.

16. The method of claim 14, wherein, when the OFDMA frame is based on the second OFDMA frame format, the OFDMA frame includes the first data modulated within first one or more sub-carriers of the OFDMA frame and the second data modulated within second one or more sub-carriers of the OFDMA frame.

17. The method of claim 14, wherein, when the OFDMA frame is based on the second OFDMA frame format, the OFDMA frame includes:
the first or the second encoded data modulated within first one or more sub-carriers of the OFDMA frame; and
other encoded data, which includes data for two or more other wireless communication devices, modulated within second one or more sub-carriers of the OFDMA frame.

18. The method of claim 14 further comprising:
generating another OFDMA frame that includes a coding parameter definition field, wherein the first and second one or more coding parameters are interpreted based on the coding parameter definition field; and
via the communication interface of the wireless communication device, transmitting the another OFDMA frame to the first and second other wireless communication devices before transmitting the OFDMA frame to the first and second other wireless communication devices.

19. The method of claim 14 further comprising:
encoding the first data using the first one or more coding parameters to generate the first encoded data, wherein the first one or more coding parameters includes at least one of first modulation type, first modulation coding set (MCS), first coding type, first code rate, first beamforming parameter, first spatial diversity configuration, first frequency diversity configuration, first space-time stream configuration, duration of at least one of the first data or the second data, first short training field (STF), first long training field (LTF), first at least one OFDMA symbol boundary, or first number of OFDMA symbols; and
encoding the second data using the second one or more coding parameters to generate the second encoded data, wherein the second one or more coding parameters include at least one of second modulation type, second MCS, second coding type, second code rate, second beamforming parameter, second spatial diversity configuration, second frequency diversity configuration, second space-time stream configuration, duration of at least one of the first data or the second data, second STF, second LTF, second OFDMA symbol boundary, or second number of OFDMA symbols.

20. The method of claim 14, wherein the wireless communication device is an access point (AP), and at least one of the first or second other wireless communication devices includes a wireless station (STA).

* * * * *